March 26, 1968     A. P. HOPE     3,375,134
METHOD FOR CLEARING POLYVINYL TUBING
Filed March 27, 1963
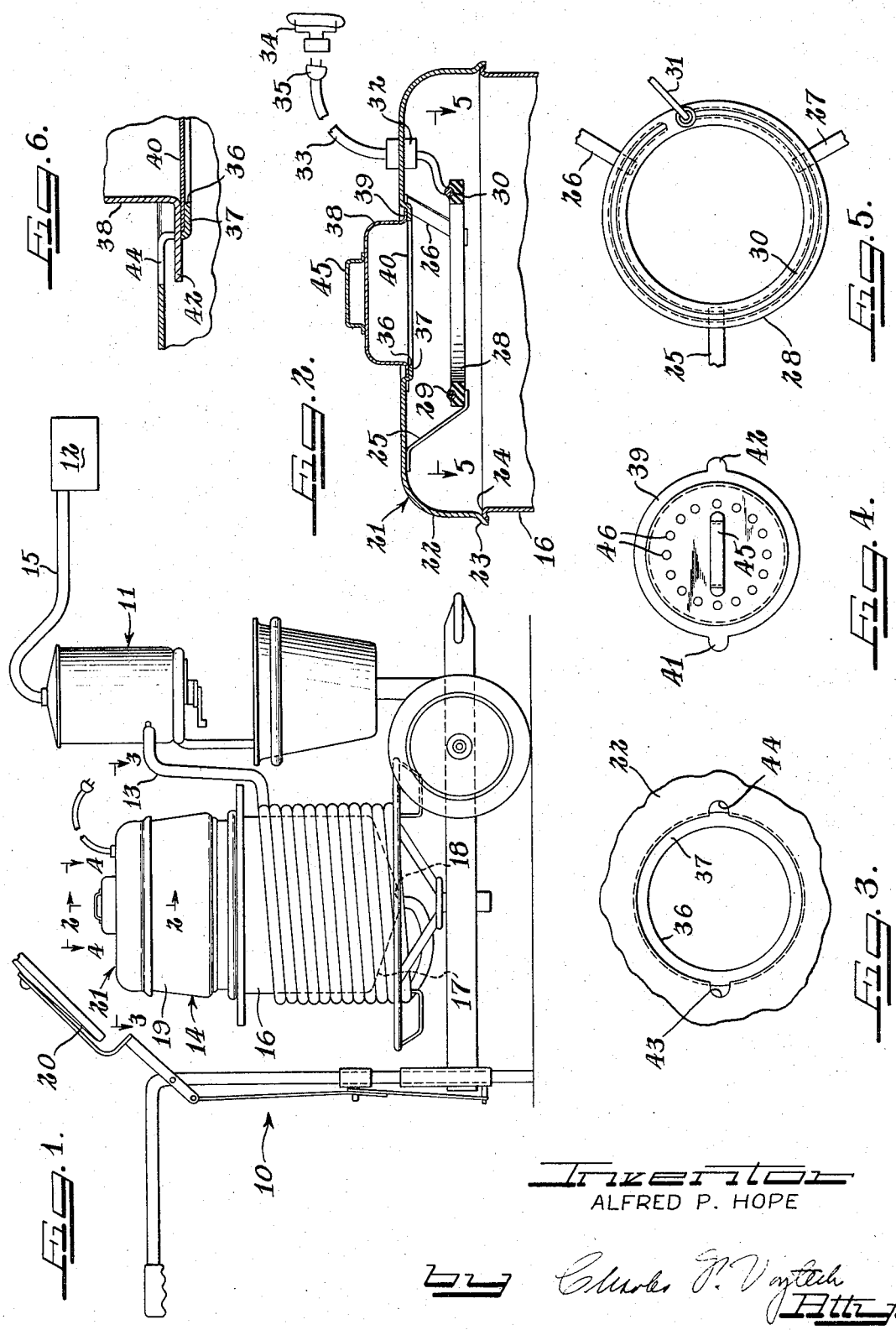
INVENTOR
ALFRED P. HOPE

United States Patent Office 3,375,134
Patented Mar. 26, 1968

3,375,134
METHOD FOR CLEARING POLYVINYL TUBING
Alfred Paul Hope, South Haven, Mich., assignor to Werner Machinery Company, Grand Rapids, Mich., a corporation of Michigan
Filed Mar. 27, 1963, Ser. No. 268,393
4 Claims. (Cl. 134—21)

This invention relates to a method for clearing polyvinyl tubing. It will be described for purposes of illustration with reference to its application to tubing sold commercially under the trade name of Tygon, and manufactured by United States Stoneware Co., Talmadge Ave., Akron 9, Ohio.

Tubing made of Tygon is presently approved for use in the dairy industry where it takes the place of rigid metal or glass pipes. It is also used on the dairy farm to conduct milk into and out of bulk storage tanks located on such farms and in which milk is stored under refrigerated conditions until it is picked up by a milk processing dairy. It has been found, however, that after a period of several months' use the Tygon tubing, which initially is transparent, acquires a milky white coating on the interior thereof, so that it is no longer transparent. To facilitate the inspection of the interior of the tubing, however, it is desirable that the transparent characteristic of the Tygon be maintained, and hence the translucent milky white coating on the interior of the tubing renders such tubing undesirable for further use.

It is accordingly an object of this invention to provide a method for removing the translucent coating acquired on the interior of Tygon tubing through use in the dairy industry, and restoring the Tygon tubing to its initial transparent condition.

It is not presently known what causes the appearance of the white coating on the interior of Tygon tubing which has been in use for some time to conduct milk from one place to another. The coating appears to be more prominent and more readily formed when relatively strong chlorine solutions are used to clean the tubing after milk has been passed therethrough. It is believed that the coating represents a chemical change brought about in the skin layer of the interior of the tubing by reaction with the chlorine in the cleaning solution, and the oxygen in the air, but I have not been able to determine definitely that this is the case. The coating becomes increasingly thick and resists all known cleaners and cleaning solutions now available for use with dairy equipment. The presence of the coating, however, does not appear to affect the bacteria count in the milk passed therethrough, and milk of satisfactory quality is not rendered appreciably less satisfactory after contact with the coating.

I have discovered that the aforementioned coating can be made to disappear from the interior of the tubing merely upon the application of heat thereto. Once the coating has been made to disappear completely by the application of heat, the subsequent cooling of the interior surface does not cause the coating to reappear. Thus I have found that leaving tubing having such coating therein exposed to sunlight for several hours is sufficient to cause the exposed coating to disappear.

Alternatively, I have found that the application of heated air to the coating will also cause the coating to disappear. Thus, hot air may be drawn through Tygon tubing having a milky coating therein, and when, by observation, the coating is seen to disappear and the tubing is transparent, the passage of heated air through the tubing may be stopped and the tubing is then in a condition comparable to that in which it was initially used.

Although heating the tubing itself is effective to eliminate the objectionable coating, far more time is required by this method than by drawing heated air through the tubing, since the tubing, which is quite thick to resist collapsing under 15 inches of mercury vacuum, must be heated in its entirety by this method instead of heating just the objectionable coating.

In carrying out the process in connection with Tygon tubing, it has been noted that the end of the tubing through which the heated air enters becomes clear first, and that the clear portion of the tubing gradually increases with time until the entire tubing is clear. Thus the length of time required to clear a length of tubing is best determined visually. The length of time will depend upon the temperature of the heated air, the volume of the heated air moved through the tubing per unit time and, of course, the length of the tubing. The range of temperatures in which the clearing effect is attainable varies from about 125° F. to the temperature at which the Tygon material begins to soften.

A form of apparatus by which this method may be carried out is shown in the accompanying drawings, in which:

FIGURE 1 is a side elevational view of a cart used to transport milk from a barn to a bulk storage tank, the apparatus of this invention being shown applied to the cart;

FIGURE 2 is an enlarged fragmentary side elevational view in section of the heating apparatus used in connection with the cart of FIGURE 1;

FIGURE 3 is a fragmentary bottom view of a portion of the apparatus of FIGURE 2, said portion including a filter used in the process;

FIGURE 4 is a plan view of a filter holding portion of the apparatus of FIGURE 2;

FIGURE 5 is a plan view in section of the heating element of the apparatus of FIGURE 2, the plan view being taken along line 5—5 of FIGURE 2; and FIGURE 6 is a greatly enlarged fragmentary elevation in section of the means for securing the filter element in place.

The form of apparatus chosen to illustrate this invention is particularly adapted for use with a milk receiving cart such as that shown in my copending application, Ser. No. 714,571, filed Feb. 11, 1958, for Mobile Receptacle for Milk Transporting System, now abandoned.

The particular apparatus illustrative of this invention and shown in FIGURE 1 is comprised in general of a cart designated generally by the reference character 10, a vacuum operated releaser 11 which is normally disposed over a bulk storage tank (not shown) but in FIGURE 1 is shown mounted on cart 10 for cleaning purposes, a vacuum pump 12 shown diagrammatically as a rectangle, a Tygon hose 13 connecting the releaser to a milk receiving tank 14 mounted on cart 10 and forming a removable part thereof, and a hose 15 of rubber or similar material connecting releaser 11 to vacuum pump 12. The details of construction of cart 10, as well as of the receptacle, are shown in my aforesaid pending application and will not be repeated here.

Tank 14 includes a main body portion 16 having a tapered bottom 17 and an outlet 18 connected to one end of hose 13. Immediately above main body portion 16 and supported thereby is a filter section 19 for which is supplied a removable cover 20 adapted to be raised and lowered from the filter section 19 by a foot operated treadle (not shown). When in normal use handling milk, a floating ball valve (not shown) is used to block outlet opening 18 when the level of the milk in tank 16 falls below a predetermined point, or the tank is, in fact, empty. When the apparatus is to be cleaned, however, the ball is removed. It is the cleaning and hose-clarifying cycle with which the present invention is concerned, and hence the floating ball valve is not shown.

Releaser 11, during normal milk handling operation, is provided with automatically operable valves (not shown) which function alternately to open said releaser to the atmosphere when the milk therein is to be dumped and to the vacuum pump 12 when the apparatus is to be cleaned or milk is to be drawn thereinto. These valves are disclosed in my Patent No. 2,895,450, granted July 21, 1959, but they play no part in the apparatus for clearing the Tygon hose 13 other than that the valve opening the interior of releaser 11 to vacuum hose 15 is open, and hence said valves are not disclosed herein in detail.

In the apparatus chosen to illustrate this invention, it is contemplated that the Tygon hose 13 shall be cleaned and cleared of any white deposit therein without detaching the hose from its associated apparatus. To this end a heating unit 21 shown in FIGURE 2 is provided, which takes the place of cover 20 during the clearing operation, and the necessary movement of heated air through the Tygon hose 13 is effected by utilizing vacuum pump 12 in the normal manner.

Heating unit 21 is comprised of a stainless steel cover 22 having a flared edge 23 adapted to rest on the rolled upper edge 24 of tank 16. It is contemplated that the flared edge 23 shall be accurately made with reference to the rolled edge 24 so that a substantially gas-tight fit is formed between the two.

On the inside of the stainless steel cover 22 are secured, preferably by welding or the like, three or more brackets 25, 26 and 27, which extend downwardly relative to cover 22, and on which rests a ring 28 in the upper surface of which is formed a continuous groove 29. An electric heating element 30, preferably of the Calrod type, and having a circular configuration, is disposed in groove 29. Said element is connected by a flexible heat resistant cable 31 to a suitable electrical socket 32 into which may be plugged a cord 33 leading to a source of electrical energy 34 of 110 volt 60 cycle type. If desired, a suitable switch may be inserted (not shown) in cord 33, but normally the cord 33 is disconnected from line 34 by a suitable plug 35 or other means.

A central opening 36 is formed in cover 22, said opening being defined by a depressed radially inwardly extending flange 37, which supports and centers a stainless steel lid 38. Said lid 38 has a radially extending flange 39 formed thereon, which overlies flange 29. Between flanges 37 and 39 is clamped a disc-shaped filter element 40 of the type used to filter milk, said filter element 40 being sufficiently porous to allow air to pass therethrough.

The clamping action required to hold filter element 40 in stretched condition across opening 36 is supplied by a pair of ears 41 and 42 extending radially outwardly from flange 39, said ears being adapted to enter notches 43, 44 in cover 22 adjacent flange 37. Said notches extend peripherally around cover 22 in the shoulder connecting flange 37 to cover 22 a distance slightly greater than the width of ears 41, 42. In use, filter element 40 is placed upon flange 37 and lid 38 is then oriented over flange 37 to align ears 41 and 42 with notches 43 and 44. The said ears are dropped through notches 43, 44, and lid 38 is turned to cause ears 41, 42 to pass through the peripheral extensions of the notches and under cover 22, thereby clamping filter 40 in place.

To facilitate turning lid 38, a handle 45 is provided upon the raised central portion thereof. A series of openings 46 is punched in lid 38 to allow air to pass through said lid to the interior of cover 22, through filter element 40 and over the heating unit 30.

In operation, after the farmer has finished cleaning cart 10, releaser 11 and hose 13, he then desires to dry and clear hose 13 if the latter has become cloudy. To do this he raises lid 20 of cart 10 and holds it in raised position until he can replace lid 20 with the heating unit 21. After unit 21 is in place in filter section 19, the farmer makes certain that filter 40 is in good condition and clamped in place between lid 38 and flange 37 on cover 22. Cord 33 is then connected to the source of electricity 34 and socket 32 on cover 22, and vacuum pump 12 is operated to reduce the pressure in tank 14. With atmospheric pressure outside of the unit 21 and perforations 46 allowing air to flow through lid 38, a continuous stream of air is drawn through lid 38, and filter 40 around heating element 30 where its temperature is raised inversely as the rate of flow around the element.

The heated air passes through the tank 14 on cart 10 and into the hose 13 attached to the outlet 18 of the tank. It is a feature of this invention that heating element 30 is physically removed from the outlet 18 of the tank by substantially the entire height of the tank so that danger of overheating hose 13 is eliminated. As the heated air passes through hose 13, the drying and clearing action produced by the heated air takes place, and any cloudiness which may be present, or which might be tending to form, is eliminated.

The clearing action is progressive along the hose 13 because of the heat absorption of the hose itself and of the cleaning fluid remaining in the hose so that the time required to clear a hose depends upon (1) the temperature of the hose, (2) the quantity of cleaning solution remaining in the hose, (3) the length of the hose, and (4) the amount of cloudiness initially present in the hose.

It is contemplated that heating unit 21 will be used once a day until the hose is dry and clear, which may take only a few minutes. If the hose is initially extremely cloudy, the heating unit may have to be used for a longer period.

Filter 40 is readily replaceable and can be the usual paper variety which is quite inexpensive. The entire heating unit can be readily cleaned although, since no fluid ordinarily comes in contact with it, it should remain clean for long periods.

If desired, a thermostat may be placed in unit 21 and arranged automatically to deenergize the heating element 30 when the temperature within unit 21 becomes excessive.

I claim:
1. The method of clearing a hose made of polyvinyl acetate of a milky coating therein resulting from use with milk followed by cleaning solutions containing chlorine, said method comprising heating said coating until said coating disappear.

2. The method of clearing a hose made of polyvinyl acetate of a milky coating therein resulting from use with milk followed by cleaning solutions containing chlorine, said method comprising heating air at a location remote from said hose and then forcing said heated air to flow through said hose until the coating disappears.

3. The method described in claim 2, wherein said hose and heated air are exposed to a pressure difference such that the heated air is at greater pressure than the air in the hose.

4. The method described in claim 2, wherein said hose and heated air are exposed to a pressure difference such that the heated air is at atmospheric pressure and the air in the hose is at sub-atmospheric pressure.

References Cited

UNITED STATES PATENTS

| | | | |
|---|---|---|---|
| 1,613,185 | 1/1927 | Mitchell | 134—21 |
| 2,837,831 | 6/1958 | Gates | 34—92 |
| 2,880,523 | 4/1959 | Overton | 34—92 |
| 2,974,071 | 3/1961 | Morris | 134—21 |
| 3,067,756 | 12/1962 | Bruggink | 134—21 X |

MORRIS O. WOLK, *Primary Examiner.*

J. T. ZATARGA, *Assistant Examiner.*